United States Patent [19]

Akasako et al.

[11] Patent Number: 5,564,188
[45] Date of Patent: Oct. 15, 1996

[54] ROLLING GUIDE UNIT PRODUCTION PROCESS

[75] Inventors: Tsuneo Akasako, Shizuoka-ken; Masaharu Yoshida, Kanagawa-ken, both of Japan

[73] Assignee: Nippon Thompson Co., Ltd., Tokyo, Japan

[21] Appl. No.: 600,480

[22] Filed: Feb. 13, 1996

Related U.S. Application Data

[60] Continuation of Ser. No. 293,061, Aug. 19, 1994, abandoned, which is a division of Ser. No. 77,441, Jun. 17, 1993, Pat. No. 5,374,126.

[30] Foreign Application Priority Data

Jun. 19, 1992 [JP] Japan .................................. 4-184660
May 27, 1993 [JP] Japan .................................. 5-148573

[51] Int. Cl.$^6$ ............................................... F16C 33/00
[52] U.S. Cl. ................... 29/898.03; 29/434; 29/898.12; 29/898.15; 384/15
[58] Field of Search ............................... 29/434, 898.03, 29/898.12, 898.15, 527.2; 384/15, 42, 43, 45, 492, 908

[56] References Cited

U.S. PATENT DOCUMENTS

| | | | |
|---|---|---|---|
| 2,675,276 | 4/1954 | Daugherty | 29/898.03 X |
| 3,115,696 | 12/1963 | Evans | 29/898.03 |
| 4,320,549 | 3/1982 | Greb | 29/898.03 X |
| 4,944,606 | 7/1990 | Lindsey et al. | 384/42 |
| 5,042,153 | 8/1991 | Imao et al. | 29/898.12 |
| 5,137,371 | 8/1992 | Osawa | 384/45 |
| 5,207,513 | 5/1993 | Kondo et al. | 384/492 |
| 5,250,126 | 10/1993 | Ohya et al. | 29/898.03 X |

*Primary Examiner*—S. Thomas Hughes
*Attorney, Agent, or Firm*—Sughrue, Mion, Zinn, Macpeak & Seas

[57] ABSTRACT

The present invention relates to a rolling guide unit wherein spatter scattered as a result of arc welding, gas welding and so forth does not adhere to the track rail.

The effect is obtained by forming a fluororesin coating layer on the surface of the track rail.

9 Claims, 3 Drawing Sheets

# ROLLING GUIDE UNIT PRODUCTION PROCESS

This is a Continuation of application Ser. No. 08/293,061 filed Aug. 19, 1994, now abandoned, which is a divisional of application Ser. No. 08/077,441 filed Jun. 17, 1993, now U.S. Pat. No. 5,374,126.

BACKGROUND OF THE INVENTION

1. Field of the Invention

The present invention relates to a rolling guide unit that guides a movable element to be moved in a mechanism such as a machine tool or industrial robot.

2. Description of the Prior Art

A prior art linear motion rolling guide unit, is composed of a track rail in which a track is formed in the lengthwise direction, a slider that slides over this track rail, and a plurality of rolling elements that are arranged and contained in a rolling element circulating path formed within this slider, which bear the load of the slider on the track rail by rolling over the above-mentioned track.

The track rail of this linear motion rolling guide unit is typically mounted on the bed of a machine tool and so forth, and a workpiece and so forth is placed on the slider. This linear motion rolling guide unit is then used so as to change the position of the workpiece and so forth by movement of the slider.

In addition, lubrication is continuously supplied to the rolling elements so as to maintain smooth sliding motion.

In the case where the above-mentioned linear motion rolling guide unit is, for example, incorporated as a portion of a machine that performs welding work in the production process of automobiles and so forth, if metal particles (spatter) that are scattered as a result of arc welding and so forth adhere to the track rail, these metal particles end up impairing normal operation of the slider. Consequently, although scrapers provided on the end of the slider were used in the prior art to remove metal particles and so forth that are scattered, sufficient results were still unable to be obtained.

SUMMARY OF THE INVENTION

In consideration of the above-mentioned points, the object of the present invention is to provide a rolling guide unit and its production process that allows stable operation at all times without the adherence of metal particles and so forth produced during welding work and similar work.

The present invention comprises a rolling guide unit having: a track rail in which a track is formed in the lengthwise direction; a slider able to move relative to said rail; and, a plurality of rolling elements juxtapositioned between said track rail and slider, rolling over said track; wherein, a fluororesin coating layer is formed on the surface of said track rail.

In addition, the present invention comprises a process for producing a rolling guide unit having: a track rail in which a track is formed in the lengthwise direction; a slider able to move relative to said track rail; and, a plurality of rolling elements juxtapositioned between said track rail and slider, rolling over said track; wherein, a track rail block is made available having the pattern of said track rail, and a process is contained whereby a fluororesin coating layer is formed on the surface of said track rail block.

DESCRIPTION OF THE PREFERRED EMBODIMENTS

The following provides an explanation of one embodiment of the present invention with reference to the drawings.

Figure 1:
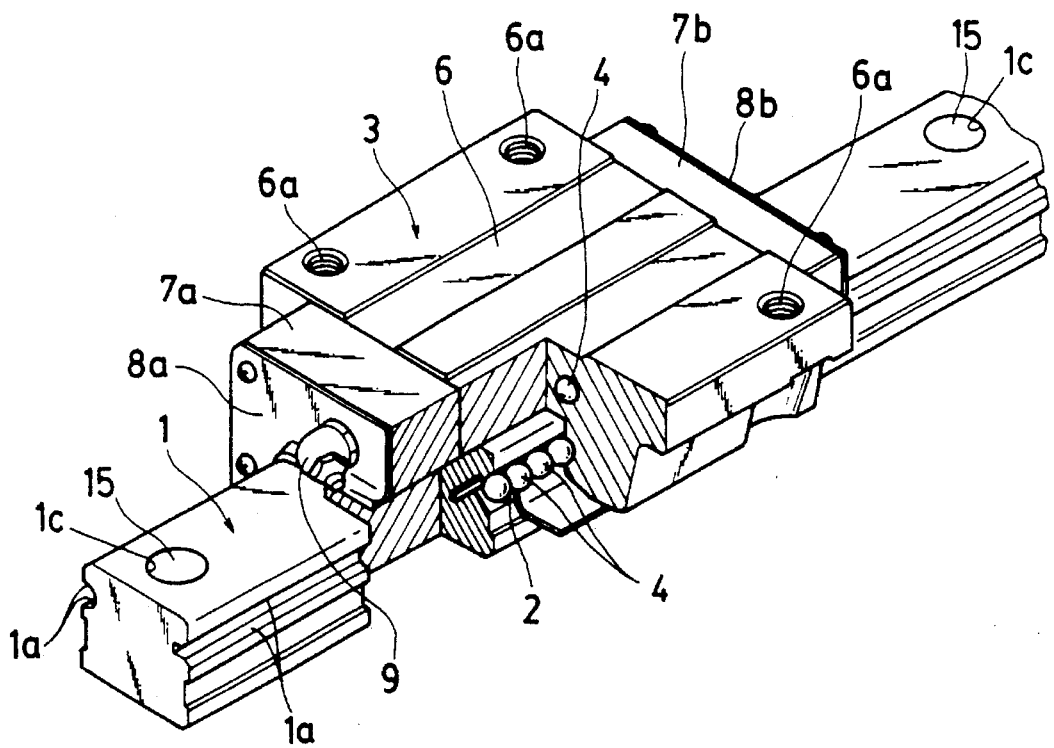
FIG. 1 is a perspective view, including a partial cross-section, indicating the essential components of a linear motion rolling guide unit as an embodiment of the present invention.
Figure 2:
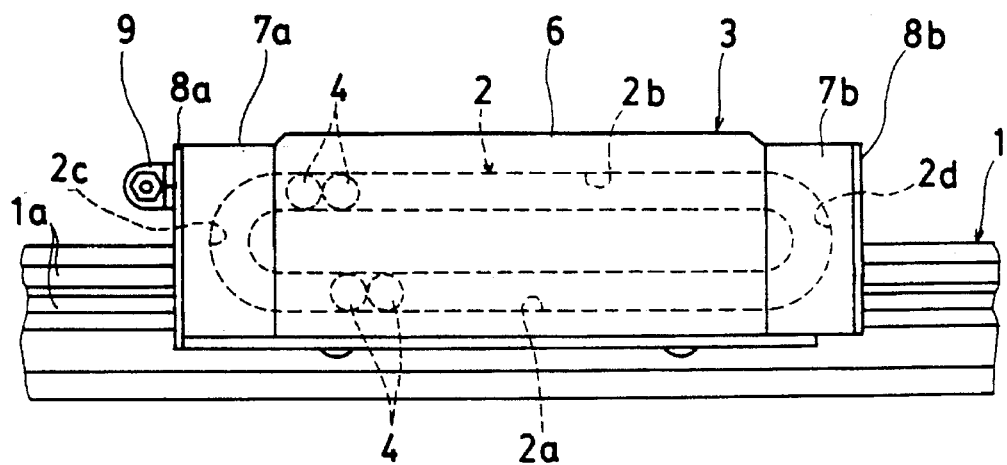
FIG. 2 is a side view of the essential components of the linear motion rolling guide unit indicated in FIG. 1.

FIG. 1 is a perspective view containing a partial cross-section of the linear motion rolling guide unit pertaining to the present invention, and FIG. 2 is a side view of said linear motion rolling guide unit.

As indicated in the drawings, said linear motion rolling guide unit has track rail 1, in which one track groove 1a each is formed along the lengthwise direction on both the right and left sides as a track, and rolling element circulating path 2 (to be described in detail below. In addition, said linear motion rolling guide unit also includes a sliding unit 3, able to move relatively to the track rail 1, which is composed of a slider and a plurality of rolling elements in the form of balls 4 that bear the load between track rail 1 and sliding unit 3 by circulating within rolling element circulating path 2 while rolling over the above-mentioned track groove 1a accompanying movement of sliding unit 3.

Sliding unit 3 has casing 6, a pair of end caps 7a and 7b connected to both ends of said casing 6, and two seals 8a and 8b attached to the outsides of each of said end caps 7a and 7b. Furthermore, grease nipple 9 is mounted on end cap 7a to supply grease to the above-mentioned balls 4. As indicated in FIG. 2, Foiling element circulating path 2 is composed of load bearing track groove 2a and return path 2b each formed linearly and mutually in parallel in casing 6, and a pair of substantially semicircular direction changing paths 2c and 2d formed in both end caps 7a and 7b, and connected to said load bearing track groove 2a and return path 2b at both of their ends. Furthermore, the above-mentioned load bearing track groove 2a is in opposition to track groove 1a of track rail 1.

Figure 3:
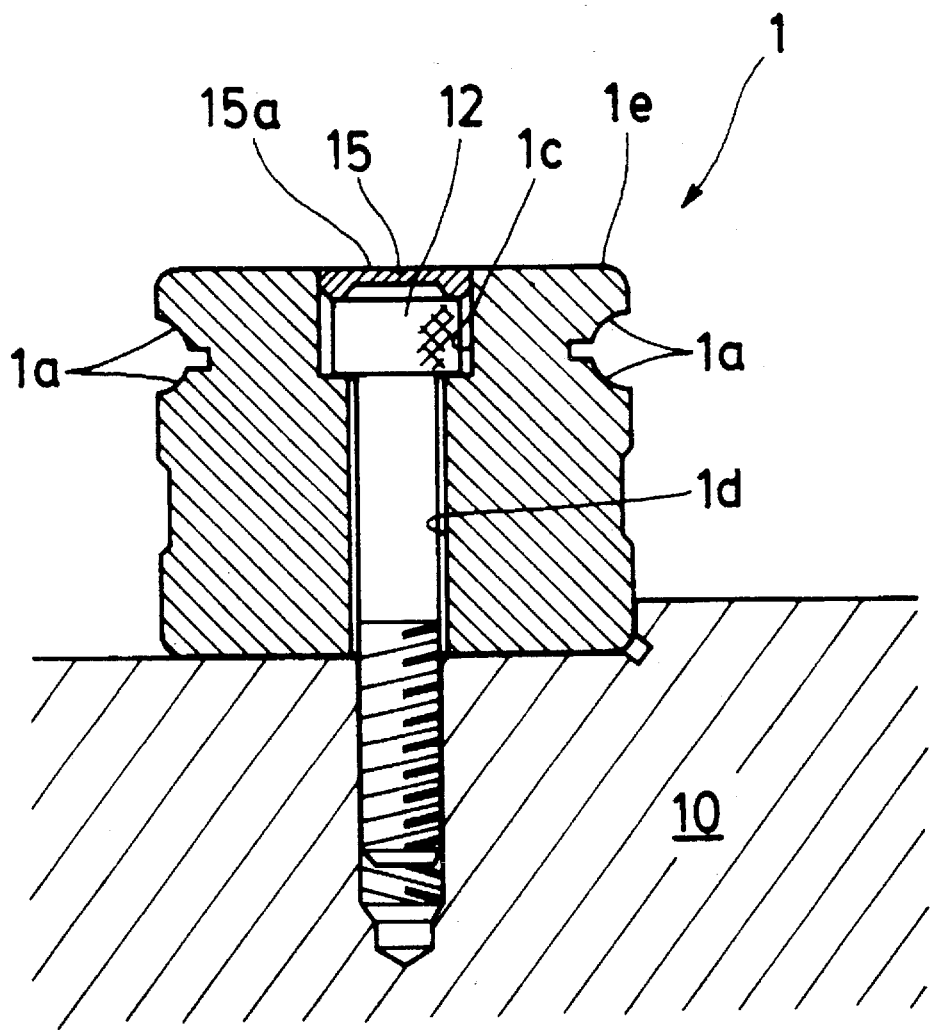
FIG. 3 is a vertical cross-sectional view indicating a track rail equipped on the linear motion rolling guide unit indicated in FIGS. 1 and 2 mounted on a base.

The linear motion rolling guide unit having the above-mentioned constitution is arranged, for example, on the flat bed 10 such as a frame (indicated in FIG. 3) equipped with a machine tool, and track rail 1 is screwed by a plurality of bolts 12 (with hexagonal sockets) to said bed 10. A table for holding a workpiece and so forth (not shown) is bolted to sliding unit 3, and this operates as the moving side. Namely, the linear motion rolling guide unit is moved back and forth by a driving device with a workpiece and so forth placed on said table. Required processing, for example, cutting processing, is then performed on said workpiece and so forth accompanying this movement. As indicated in FIGS. 1 and 3, countersunk portions 1c, having a diameter larger than the heads of said bolts 12, and holes 1d, having a diameter slightly larger than the threaded portions of bolts 12, are formed mutually concentrically in a row in track rail 1 and in the lengthwise direction of track rail 1. Bolts 12 are screwed into bed 10 by being inserted into said countersunk portions 1c and holes 1d so as to be completely embedded. These countersunk portions 1c and holes 1d are generically referred to as insertion holes.

As indicated in FIGS. 1 and 3, substantially disc-shaped plugs 15, which are pressed-fitted in this case, are inserted so as to cover the openings of the countersunk portions 1c. Said plugs 15 are formed from a material such as aluminum, steel or plastic, and as is clear from FIG. 3, their outside surfaces 15a are formed to be flat and in the same plane as surface 1e of track rail 1. Furthermore, indicated in FIG. 1, a plurality of threaded holes 6a are formed in the upper surface of casing 6 of sliding unit 3. The above-mentioned table is then fastened to sliding unit 3 by bolts (not shown) that are screwed into these threaded holes 6a.

Figure 4:
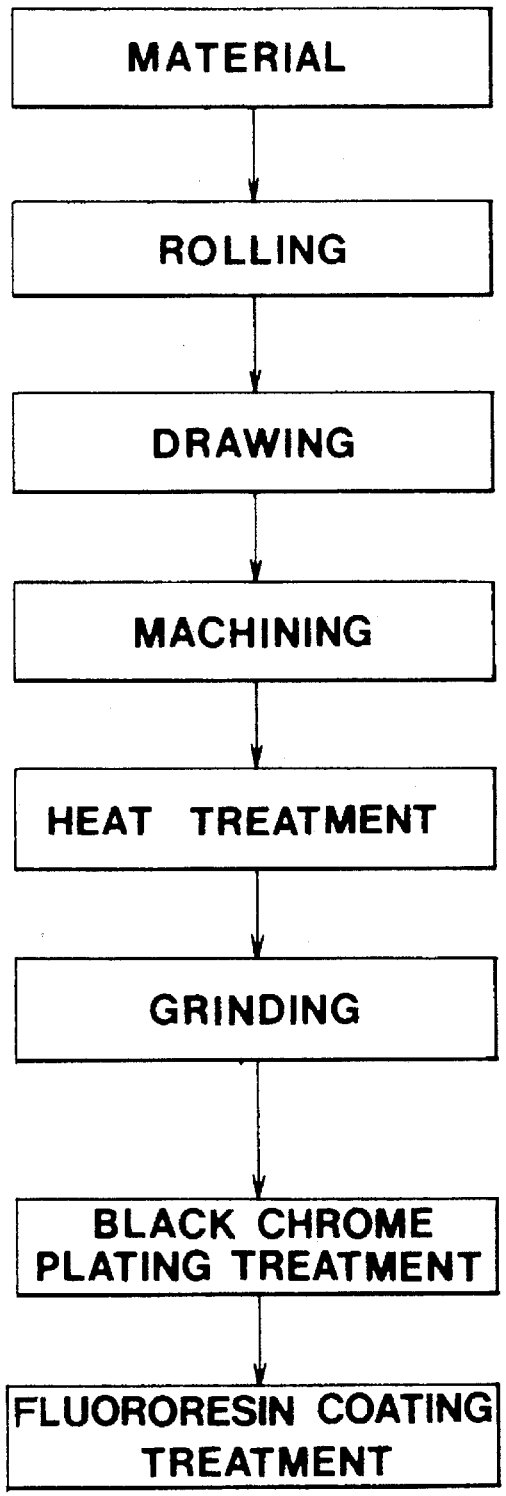
FIG. 4 is a flow chart indicating the fabrication procedure for the track rail equipped on the linear motion rolling guide unit indicated in FIGS. 1 and 2.

Production of the above-mentioned track rail 1 is performed in the manner of the procedure of the flow chart indicated in FIG. 4.

First, after making available material in the form of quenchable steel such as SCM415 or S55C, and rolling out said material, the material is drawn and cut to the prescribed dimensions. Various machining is then performed on the cut material. Namely, rough processing of the outer shape is performed, such as one each of track grooves 1a in both the left and right sides of the cut material. Next, drilling of bolt insertion holes 1b and the required thread processing and so forth are performed. The track rail block is formed in this manner. Following said machining, required heat treatment is performed, such as quenching of the surface of the track rail block. Next, grinding of the reference surface and track grooves 1a based on said reference surface is performed on said track rail block. In addition, plating, for example, black chrome plating, is performed over the entire surface.

Black chrome plating is performed, for example, by performing low temperature treatment at −10° C. using a solution having a chrome content of 60%. Inhibiting effects can be obtained as a result of this black chrome plating. Although black chrome is used in this case, other materials demonstrating similar effects may also be used provided they prevent rust.

Finally, fluororesin coating is performed on the track rail block following black chrome plating. Coating of fluororesin is performed by spraying a resin paint containing 25% fluorine over the entire surface of the track rail block, and baking for approximately 10 minutes at 150°–180° C. to form a fluororesin coating having a thickness of 10 μm or less.

The above procedure allows the fabrication of a track rail of high accuracy.

As described above, in the fabrication of track rail 1 in the present embodiment, black chrome plating and fluororesin coating treatment are performed after grinding the reference surface and track grooves 1a, which prevents the adherence of metal particles to said track grooves 1a of track rail 1. Conversely, grinding of the reference surface and track grooves 1a may also be performed after first performing black chrome plating and fluororesin coating treatment. However, in this case, prevention of rusting of said reference surface and track grooves 1a, and prevention of adherence of metal particles and so forth, is to be performed by means of applying lubricator or inhibitor.

As described above, although inhibiting effects are obtained by performing plating using black chrome and so forth, with respect to preventing adherence of metal particles, since adhesive force is weakened significantly by performing fluororesin coating, in addition to the metal particles being able to be removed easily without having to perform any special work or treatment, since it is also not necessary to perform scraping with excessive force, cleaning can be performed without causing damage to the track rail and so forth.

However, in this embodiment, plugs 15 are press fit so as to cover the openings of each countersunk portion 1c formed in track rail 1 wherein bolts 12 are inserted as indicated in FIGS. 1 and 3.

Similar to track rail 1, inhibiting treatment and fluororesin coating treatment are also performed on these plugs 15. More specifically, after forming said plugs 15 using each of the types of materials described above, an inhibiting film is formed by performing black chrome plating treatment on outside surfaces 15a of said plugs 15 following a similar procedure as that for track rail 1 described above. Continuing, a fluororesin coating layer is then formed by performing fluororesin coating treatment on this inhibiting film following a similar procedure as in track rail 1. Furthermore, an inhibiting film is not required in the case plugs 15 are of a material such as plastic that does not require prevention of rust. In addition, this inhibiting film and fluororesin coating layer with respect to plugs 15 can be formed simultaneously to formation of an inhibiting film and fluororesin coating layer on track rail 1 by installing said plugs 15 in track rail 1.

Furthermore, although balls 4 circulate in sliding unit 3 accompanying movement of said sliding unit 3, the present invention is not limited to said constitution, but other constitutions may naturally also be applied as well. Moreover, although balls are used for the rolling elements in the above-mentioned embodiment, a constitution in which rollers are used is also possible.

In addition, the present invention can also be applied in the form of other embodiments in the case of track rail 1 having a certain curvature and performing curved operation.

According to the present invention as explained above, since a fluororesin coating layer is formed on the surface of the track rail, the adherence of foreign objects to the track rail surface can be prevented. This adherence preventive effect is particularly great with respect to metal particles (spatter) that are scattered as a result of arc welding, gas welding and so forth.

In addition, since the fluororesin coating layer has an extremely thin film and is formed directly on the track, together with the dimensional accuracy of the track rail being stable, noise produced during movement of the slider can be held to a low level.

What is claimed is:

1. A process for producing a rolling guide unit, said rolling guide unit comprising a track rail of a given pattern and in which a track is formed in the lengthwise direction, said track including a rolling surface; a slider operative to move relative to said track rail; and a plurality of rolling elements juxtapositioned between said track rail and said slider and which roll over said track on said rolling surface; said process comprising the steps of:

machining and grinding a track rail block so as to have the pattern of said track rail; and after the grinding, forming a thin film fluororesin coating layer having a thickness of less than or equal to 10 μm on all surfaces of said track rail block including said rolling surface for said rolling elements, wherein said step of forming said thin film fluororesin coating layer includes spraying a resin paint over said track rail block.

2. The process for producing a rolling guide unit described in claim 1, further comprising the step of forming an inhibiting film on said track rail block prior to the step of forming said thin film fluororesin coating layer.

3. The process for producing a rolling guide unit described in claim 1, further comprising the step of forming a black chrome plating on said track rail block prior to the step of forming said thin film fluororesin coating layer, said step of forming said black chrome plating including performing a low temperature treatment at −10° C. using a solution having a chrome content of 60%.

4. The process for producing a rolling guide unit described in claim 1, wherein said step of forming said thin film fluororesin coating layer includes baking the resin paint for approximately 10 minutes at 150°–180° C.

5. A process for producing a rolling guide unit, said rolling guide unit comprising a track rail of a given pattern and in which a track is formed in the lengthwise direction, said track including a rolling surface; a slider operative to move relative to said track rail; and a plurality of rolling elements juxtapositioned between said track rail and said slider and which roll over said track on said rolling surface; said process comprising the steps of:

providing a track rail block so as to have the pattern of said track rail;

forming a thin film fluororesin coating layer having a thickness of less than or equal to 10 μm on said track rail block, wherein said step of forming said thin film fluororesin coating layer includes spraying a resin paint over said track rail block; and grinding the rolling surface of said track rail block so as to remove said thin film fluororesin coating layer.

6. The process for producing a rolling guide unit described in claim 5, wherein said step of forming said thin film fluororesin coating layer includes baking the resin paint for approximately 10 minutes at 150°–180° C.

7. A process for producing a linear motion rolling guide unit for use in a welding environment wherein metal particles that are scattered during welding tend to adhere to surfaces of said linear motion rolling guide unit, said linear motion rolling guide unit comprising a track rail of a given pattern and in which a track is formed in a lengthwise direction, said track rail including a track surface; a slider operative to move relative to said track rail; and a plurality of rolling elements juxtapositioned between said track rail and said slider and which roll over and contact said track surface of said track rail; said process comprising the steps of:

providing a track rail block having the pattern of said track rail; and forming a thin film fluororesin coating layer having a thickness of less than or equal to 10 μm on all surfaces of said track rail except for said track surface of said track rail at which said track rail and rolling elements make contact, for preventing the metal particles that are scattered during welding from adhering to said track rail, wherein said step of forming said thin film fluororesin coating layer includes spraying a resin paint over said track rail block.

8. The process for producing a rolling guide unit described in claim 15, wherein said step of providing a track rail block comprises:

(a) rolling out, drawing and cutting a steel material to prescribed dimensions;

(b) rough processing the steel material to form right and left track grooves;

(c) drilling bolt insertion holes in the rough processed steel material;

(d) quenching the entire surface of said track rail block;

(e) grinding a reference surface and the track grooves based on said reference surface; and (f) plating the entire surface of said track rail block with a black chrome plating.

9. The process for producing a rolling guide unit described in claim 7, wherein said step of forming said thin film fluororesin coating layer includes baking the resin paint for approximately 10 minutes at 150°–180° C.

* * * * *